United States Patent
Naik et al.

(10) Patent No.: US 6,696,392 B2
(45) Date of Patent: Feb. 24, 2004

(54) SILICONE RESIN BONDED DRY FILM LUBRICANTS

(75) Inventors: Subhash K. Naik, Carmel, IN (US); James M. Klotz, Quakertown, PA (US); Michael J. Barber, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 10/113,298

(22) Filed: Mar. 29, 2002

(65) Prior Publication Data

US 2003/0224947 A1 Dec. 4, 2003

Related U.S. Application Data

(63) Continuation of application No. 09/631,447, filed on Aug. 2, 2000, now abandoned, which is a continuation of application No. 09/266,229, filed on Mar. 10, 1999, now abandoned.

(51) Int. Cl.$^7$ ............................................. C10M 105/76
(52) U.S. Cl. ..................... 508/121; 508/126; 508/129; 508/169; 508/173; 508/212; 427/387; 427/407.1; 427/419.1; 428/447; 428/688; 428/689; 428/697; 428/699
(58) Field of Search ................................. 508/173, 154, 508/126, 121, 129, 169, 212; 429/387, 407.1, 419.1; 428/447, 688, 689, 697, 699

(56) References Cited

U.S. PATENT DOCUMENTS

| | | | |
|---|---|---|---|
| 2,446,251 A | 8/1948 | Stricklin | 508/154 |
| 2,466,642 A | 4/1949 | Larsen | 508/173 |
| 2,982,707 A | 5/1961 | Scheible et al. | 204/181 |
| 3,215,630 A | 11/1965 | Compton et al. | 508/154 |
| 3,311,555 A | 3/1967 | Ehrlenspiel et al. | 508/154 |
| 3,377,279 A | 4/1968 | Sibert | 508/154 |
| 3,419,110 A | 12/1968 | Polti | 508/154 |
| 3,567,676 A | 3/1971 | Herrigel et al. | 260/37 |
| 3,575,838 A | 4/1971 | Hughes | 204/181 |
| 3,775,318 A | 11/1973 | Lavik et al. | 252/12 |
| 3,983,044 A | 9/1976 | Felton, Jr. | 508/173 |
| 4,168,241 A | 9/1979 | Kozima et al. | 508/154 |
| 4,299,746 A | 11/1981 | Frye | 106/287.12 |
| 4,439,470 A | 3/1984 | Sievers | 427/252 |
| 4,584,116 A | 4/1986 | Hermant et al. | 508/154 |
| 4,656,099 A | 4/1987 | Sievers | 428/610 |
| 5,015,401 A | 5/1991 | Landry et al. | 508/154 |
| 5,057,196 A | 10/1991 | Creech et al. | 204/181.5 |
| 5,154,839 A | 10/1992 | Hanano | 508/154 |
| 5,399,192 A | 3/1995 | Yamasoe | 106/286 |
| 5,744,244 A | 4/1998 | Camilletti et al. | 428/447 |

FOREIGN PATENT DOCUMENTS

| | | |
|---|---|---|
| EP | 372559 | 5/1990 |
| GB | 1027965 | 5/1966 |

OTHER PUBLICATIONS

Smith, J.S. et al., "Platinum Modified Aluminides—Present Status" Presented at the Gas Turbine and Aeroengine Congress and Exposition, Jun. 11–14, 1990—Brussels, Belgium.

Roberts, E.W. et al., "Solid Lubricant Coatings: Their Performance and Applicability at Temperature Extremes" *Protective Coatings and Thin Films*, 1997: 135–156. month unavailable.

Sliney, Harold E., "Rare Earth Flourides and Oxides—An Exploratory Study of Their Use as Solid Lubricants at Temparatures to 1800° F. (1000° C.)" *NASA Technical Note*, NASA TN D–5301; Jul., 1969.

*Primary Examiner*—Margaret Medley
(74) *Attorney, Agent, or Firm*—Woodard, Emhardt, Moriarty, McNett & Henry LLP

(57) ABSTRACT

Dry film lubricant coatings are provided by using a silicone resin binder, either as an aqueous emulsion or in a solvent-based system, to fix an alkaline earth metal fluoride to a substrate. The compositions used to apply the coatings may also include relatively minor amounts of xylene, ammonium benzoate, a wetting agent, and/or a porosity-inducing agent—although none of those additives remains in the cured coating.

Multi-layer dry film lubricant coatings are also disclosed, with the multi-layer coating having a basecoat layer as described above, and a topcoat layer made of a layer-lattice solid such as graphite or molybdenum disulfide, and a silicone resin, aluminum phosphate or an alkali metal silicate binder.

47 Claims, No Drawings

SILICONE RESIN BONDED DRY FILM LUBRICANTS

This application is a continuation of U.S. patent application Ser. No. 09/631,447, filed Aug. 2, 2000, now abandoned, which is a continuation of U.S. patent application Ser. No. 09/266,229, filed Mar. 10, 1999, now abandoned.

FIELD OF THE INVENTION

The present invention relates generally to dry film lubricants, and more particularly to dry film lubricants for coating metal-alloy substrates such as steel-, titanium-, nickel-, or aluminum-alloy substrates. The inventive dry film lubricants can also be applied to non-metals such as plastics, organic matrix composites, and ceramic matrix composites.

BACKGROUND OF THE INVENTION

Liquid lubricants, including petroleum-based lubricants, vegetable oil and animal oil-based lubricants do not perform well under a variety of environmental conditions such as high temperature applications, vacuum applications, nuclear radiation applications, and aerospace applications. Moreover, such lubricants, due to their nature, require additives such as oxidation inhibitors, or pour-point depressants that increase the viscosity of the lubricant at elevated temperatures.

Attempts to obtain a more versatile lubricant have resulted in the development of solid film lubricants. Solid film lubricants are typically thin films of a single solid or a combination of solids. Such lubricants perform well under the extreme pressures and temperatures required in applications where petroleum-based lubricants are less effective.

Some solid film lubricants that include line earth metals that may be mixed with a binder system are known. For example, a solid film lubricant including alkaline earth metal fluorides and an aluminum phosphate binder system is known. However, phosphate binders are acidic and may react with the fluorides and coagulate the lubricant. The coagulation of the lubricant makes it difficult to apply the lubricant to the desired surface. If the phosphate binder is neutralized so that it no longer reacts with the alkaline earth metal fluorides, the adhesive properties of the lubricant are either lost or diminished. Moreover, the range of temperatures that such a dry film lubricant can windstand are limited.

A need therefore exists for a dry film lubricant that is easy to apply to a surface, has a substantially neutral pH and can withstand higher temperatures compared to other bonded mixed fluoride systems. The present invention addresses this need.

SUMMARY OF THE INVENTION

Briefly describing one aspect of the present invention, there is provided a dry film lubricant coating comprising an alkaline earth metal fluoride and a silicone resin binder. The dry film lubricant coating is preferably applied as an aqueous coating composition comprising 10-70% alkali earth metal lubricant, 5-40% silicone resin binder (preferably an emulsion of about 50% resin and 50% water), and water. A wetting agent, an anti-rust agent, a porosity-inducing agent, and minor amounts of a solvent may also be included, either individually or in combination.

In another aspect of the invention the dry film lubricant coating can be applied as a solvent based system comprising 10-70% alkali earth metal fluoride, 5-40% silicone resin binder, and an organic solvent. A wetting agent and/or a porosity-inducing agent (preferably glycerine), may also be included, either individually or in combination.

In a further aspect of the invention a multi-layer, dry film lubricant coating is provided. The multi-layer coating has a basecoat layer comprising an alkaline earth metal fluoride and a silicone resin binder system, and a topcoat layer comprising a layer-lattice solid and a topcoat binder. The layer-lattice solid preferably includes graphite, and/or molybdenum disulfide, and/or tungsten disulfide. The topcoat binder preferably includes either a silicone resin (either in a solvent or as an aqueous emulsion), an aluminum phosphate, or an alkali metal silicate.

Articles coated with the inventive coatings, and methods of coating articles with the inventive dry film lubricant coatings, are also disclosed.

One object of the present invention is to provide superior dry film lubricant coatings capable of operating at a temperature of up to 2000° F. with good load bearing capability.

Further objects and advantages of the present invention will be apparent from the following description.

DESCRIPTION OF THE PREFERRED EMBODIMENT

For the purposes of promoting an understanding of the principles of the invention, reference will now be made to preferred embodiments and specific language will be used to describe the same. It will nevertheless be understood that no limitation of the scope of the invention is thereby intended, such alterations and further modifications of the invention, and such further applications of the principles of the invention as illustrated herein, being contemplated as would normally occur to one skilled in the art to which the invention relates.

As briefly described above, the present invention provides a system for producing single- or multi-layer dry film lubricant coatings on metallic or non-metallic substrates. Referring first to the single-layer, dry film lubricant coatings, one aspect of the present invention provides an aqueous coating composition for producing such coatings. The aqueous coating composition generally includes one or more alkaline earth metal fluorides, a silicone resin binder system, and water. An anti-rust agent, a wetting agent, a porosity inducing agent, and some solvent are also preferably included.

As to the alkaline earth metal fluorides used in the inventive coating compositions, calcium fluoride, barium fluoride, magnesium fluoride and/or cerium fluoride are preferably used, independently or in combination. All of these alkaline earth metal fluorides, and others, may be obtained commercially or may be prepared by methods known to the art.

The alkaline earth metal fluorides are generally present in the aqueous composition in amounts ranging up to 70% each. For example, $BaF_2$ is preferably present in amounts ranging from 10-70%, with 5% to 50% $BaF_2$ being more preferred, and 15-40% being most preferred. $CaF_2$ is preferably present in amounts ranging from 2% to 70%, with 3% to 50% $CaF_2$ being more preferred, and 3-30% being most preferred. $MgF_2$ and/or $CeF_2$ are preferably present in amounts ranging from 1% to 70%, with 2% to 20% being more preferred, and 3-10% being most preferred.

In certain preferred embodiments $BaF_2$ and $CaF_2$ are used in combination. Preferably, the amounts of those alkali metal fluorides range from 18-27% for BaF$_2$, and from 10-18% for CaF$_2$ when those to metal fluorides are used in combination. In general, when barium fluoride and calcium fluoride are used together, those components are preferably included in a ratio of about 1:9 to about 9:1 by weight.

In other preferred embodiments the alkali metal fluoride comprises either BaF$_2$ or CaF$_2$ used alone. In those embodiments the amounts preferably range from 28-50% for the metal fluoride used.

In other preferred embodiments the alkali metal fluoride comprises 24-32% BaF$_2$, 3-10% CaF$_2$, and 3-8% magnesium and/or cerium fluoride. Most preferably, 4-6% magnesium and/or cerium fluoride is used in such compositions.

As described above, the dry film lubricant compositions also include a silicone resin. That resin may be provided as a silicone resin emulsion, or it may be provided in an appropriate solvent system.

Most preferably, the silicone resin is an alkyl silicone resin emulsion in water, such as Silres M50E or Silres MP42E, both from Wacker Chemie GmbH. The preferred emulsions have a silicone resin content of between about 35% and about 60%, with about 40-50% silicone resin being most preferred. As is known to the art, minor amounts of emulsifying agents may be included in the aqueous silicone resin emulsions. Also, an aqueous emulsion may be made from powdered alkyl silicone resin, such as MK resin from Wacker Chemie GmbH, if commercially available aqueous silicone resin emulsions are not used.

Alternatively, the silicone resin binder may be provided as a solvent-based system, either by using a commercially available silicone resin/solvent system, or by making one from powdered alkyl silicone resin such as MK resin. In solvent-based systems the solvent may be an organic solvent such as xylene, toluene, or MEK, although in some embodiments a VOC-exempt solvent such as Oxol 100® from Occidental Chemical Co. is preferably used.

In all embodiments the silicone resin binder is used primarily to hold the lubricating powders on the surface of the substrate. In the broadest aspects of the invention any silicone resin binder system effective for that purpose may be used.

As to the amount of silicone resin binder used in the coating compositions, the coating compositions preferably include 2-40% silicone resin, more preferably 5-30% and most preferably 10-20%. In the embodiments in which the silicone resin is provided as an aqueous emulsion, 5-80% of the silicone resin emulsion (generally containing about 50% silicone resin) is preferably used. Preferably 5% to 65% silicone resin emulsion is used, with 10-50% silicone resin emulsion being more preferred, and 24-40% silicone resin emulsion being most preferred.

In another embodiment of the present invention a significant improvement in application performance is obtained when 0.5 to 15 wt. % of a solvent such as xylene is added to the silicone resin (emulsion or solids) binder. This embodiment is particularly preferred when air gun spraying is employed, although it may also have utility with other coating application methods. Preferably, 1 to 10 wt. % xylene is used, and more preferably 1.5 to 5 wt. % xylene. These small quantities of solvent prevent the silicone from "gelling" during the spray operation.

In yet another embodiment of the invention, minor amounts of an anti-rust agent such as ammonium benzoate are added to the silicone resin (emulsion or solute) binder system to prevent "spot" rusting on those metallic alloys which are prone to rusting when exposed to water and humidity (e.g., low Cr steels). The anti-rust agent is typically used as a 5% to 15% solution with water, with an 8-12% solution being more preferred and a 10% solution being most preferred. In the more preferred embodiments about 0.1-10% of a 10% solution of ammonium benzoate solution is added to the silicone based binder system, with 1-3% of the dilute ammonium benzoate solution being most preferred.

A surface wetting agent is also preferably included in the aqueous or solvent-based binder system. The preferred wetting agent is a polyether-modified dimethylpolysiloxane, although other wetting agents can be selected by persons skilled in the art without undue experimentation. Typically, 0.005 to 5 wt. % of the wetting agent is added, with the most preferred range being 0.01 to 0.2 weight percent. The wetting agent provides better adhesion to the substrate during spray operation. On processing, during the curing cycle, the wetting agent evaporates and does not remain in the coating system.

In another aspect of the present invention the aqueous or solvent-based coating composition also includes a porosity-inducing agent. The porosity-inducing agent is a fugitive agent which induces porosity in the coating by evaporating during the curing cycle. Accordingly, the porosity inducing agent is preferably an organic material that vaporizes below 260° C. (500° F.). Most preferably the porosity inducing agent is glycerine, although nitro-cellulose, polyester, etc., may be used, either alone or in combination.

The porosity-inducing agent may be present in amounts up to about 45%. Preferably, the porosity-inducing agent is present in an amount of up to about 35% by weight, with amounts between about 2% and 10% by weight being more preferred, and amounts of between about 4% and 8% by weight being most preferred. The ratio of porosity inducing agent to silicone resin is preferably about 0.1:1 to about 1:1.

The aqueous composition also includes a sufficient amount of water to suspend the dry components of the composition. The amount of water necessary will vary as a function of the concentration of solutes in the composition, however, the aqueous composition generally includes about 10 to about 80 weight percent water. In other embodiments, about 10% to about 40% by weight or about 10% to about 35% by weight water are used. The silicone:water weight ratio of the composition is preferably about 0.3:1 to about 1.5:1.

The solvent-based composition includes a sufficient amount of solvent to dissolve the silicone resin solids and suspend the fluoride components of the composition. The amount of solvent will vary as a function of the concentration of the silicone resin solids and fluorides, although the solvent composition generally includes about 10% to about 80% (by weight) solvent. In other embodiments about 10-60% solvent is used. The silicone:solvent weight ratio preferably ranges from about 0.1:1 to about 1.2:1.

The water-based compositions are preferably prepared simply by mixing the silicone resin emulsion, water, and alkali metal fluoride components together. As indicated above, it is preferable to mix minor amounts of xylene, ammonium benzoate and wetting agent into the silicone resin emulsion, and then to add the alkali metal fluoride to that mixture. Thorough mixing is necessary to uniformly disperse the alkaline earth metal fluorides, as they are only slightly soluble in water.

The solvent-based compositions are preferably prepared simply by mixing the silicone resin solids and the solvents and then add the various alkali metal fluoride to that mixture.

As indicated earlier, it is preferable to mix the minor amounts of the wetting agent to the silicone solvent mixture. Thorough mixing is necessary to uniformly disperse the alkaline earth metal fluorides, as they are only slightly soluble in the solvent.

The coating may be applied by methods known in the art, including air-gun spraying or brushing the composition on the surface of a substrate, or dipping the metal component in the composition. The thickness of the coating is typically about 1.3 $\mu$m (0.05 mils) to about 127 $\mu$m (5 mils), about 1.3 $\mu$m (0.05 mils) to about 51 $\mu$m (2 mils), 5.1 $\mu$m (0.2 mils) to about 127 $\mu$m (5 mils), and about 5.1 $\mu$m (0.2 mils) to about 51 $\mu$m (2 mils). After coating the substrate is dried and cured to fix the coating on the substrate.

More particularly describing the method of coating a substrate with the aqueous or solvent-based composition, prior to coating the surface is initially cleaned to remove any grease or oxide films that may be present. The cleaning may be by any method known to the art, including blasting the surface with appropriate grits (e.g., ceramic beads and alumina) which removes the last remnants of any oxide film and roughens the surface to allow the coating to adhere to the surface. In many instances though, the surface only needs to be cleaned/degreased without grit blasting, due to the improvement in adhesion attributed to the silicone binder.

After the coating is applied, the coating is preferably air dried for about 30 minutes, and is then oven heated at temperatures of about 66° C. (150° F.) to about 204° C. (400° F.) for at least 15 minutes. The coating is then cured by maintaining a temperature of about 232° C. (450° F.) to about 371° C. (700° F.) for about 0.5 hour to about 2 hours. If required for certain applications, the alkali metal fluoride coating can also be sintered by maintaining a temperature of about 704° C. (1300° F.) to about 927° C. (1700° F.) for about 1.2 to about 2 hours in air or an inert atmosphere.

When the inventive aqueous or solvent-based coating compositions are applied as described above, the present invention also provides dry film lubricant coatings. In one aspect of the invention, the dry film lubricant coating comprises about 10% to about 95% by weight of the alkaline earth metal fluoride, and about 5% to about 90% by weight of silicone resin. The xylene, ammonium benzoate, wing agent, and porosity-inducing agent that were included in the wet composition do not remain in the cured coating.

A further aspect of the present invention provides a multi-layer dry film lubricant coating. The multi-layer coating includes a base coat layer comprising an alkaline earth metal fluoride and a silicone resin binder system as described above, and a topcoat layer comprising an inorganic layer-lattice solid and a binder.

As to the components of the topcoat layer, the inorganic layer-lattice solid preferably comprises one or more members selected from the group consisting of molybdenum disulfide, tungsten disulfide, and graphite. Particular combinations of these materials are selected based upon the temperature at which a coated component will be exposed. For example, the topcoat layer preferably includes molybdenum disulfide or tungsten disulfide when temperatures of up to about 316° C. (600° F.) will be encountered. Graphite is preferably used when the coated component is to be used at temperatures of between about 316° and about 1093° C. (2000° F.), and is optionally included when the coated component is used at a temperature of about 204° C. (400° F.) to about 316° C.

The binder of the topcoat is preferably a silicone resin-based system, but may be an aluminum phosphate or an alkali metal silicate. When an alkali metal silicate is used it preferably includes lithium silicate, potassium silicate or sodium silicate, or mixtures thereof.

As to the relative amounts of the various components of the multi-layer formulation, in one preferred embodiment the topcoat coating comprises about 15-50% silicone resin emulsion (more preferably 24-40%), 5-65% graphite or other inorganic layer-lattice solid (more preferably 12-35%), and the remainder water (preferably 25-65%). Most preferably, 1-5% xylene, 0.001-0.2% wetting agent, and 1-3% of a 10% solution of ammonium benzoate are also included as described above. Further, 2-10% of a porosity inducing agent such as glycerine may also be used When solid silicone resin powder is used the preferred formulations comprise about 5-25% silicone resin powder (most preferably 12-20%), 12-35% graphite or other inorganic layer-lattice solid, and a significant amount of xylene or other suitable solvent (most preferably about 45-75%). A wetting agent and a porosity inducing agent may also be included if desired.

As noted above an aluminum phosphate or alkali metal silicate binder may alternatively be used in the topcoat layer. Such binders are preferably included in amounts ranging from 25-65% by weight.

As to the method of coating a substrate with the multi-layer dry film lubricant coating, the surface of a substrate is first prepared as described above before the base coat layer comprising the alkaline earth metal fluoride(s) and the silicone resin binder system is applied. Preferably, the base coat layer is then dried in an oven at a temperature of about 79° C. (175° F.) to about 177° C. (350° F.) for at least about 30 minutes. Curing is then accomplished by exposing the layer to a temperature of about 177° C. (350° F.) to about 399° C. (750° F.) for about 0.5 hour to about 2 hours. Sintering may also be carried out as described above.

The second layer comprising a layer-lattice solid and a binder is then provided as described above. The second (topcoat) layer is applied by spraying, brushing or dipping methods as is known to the art. The topcoat layer is either air dried to touch or oven dried at about 79° C. (175° F.) to about 177° C. (350° F.) for about 30 minutes. The topcoat layer can then be cured as above by placing the coated component in an oven and heating at about 232° C. (450° F.) to about 371° C. (700° F.) for about 0.5 hour to about 1.2 hours.

In an alternative embodiment, the base coat layer may be applied and oven dried as above, the topcoat layer may be applied and oven dried at 79° C. (175° F.) to about 177° C. (350° F.) for about 30 minutes and both layers may be cured in a single curing step in an oven at a temperature of about 177° C. (350° F.) to about 399° C. (750° F.) for about 0.5 hour to about 2 hours.

In yet another aspect of the multi-layer coating embodiment, a porosity-inducing agent is included in the base coat layer, the topcoat layer, or both. Amounts of up to about 45% by weight, most preferably 2-10%, may be used. As with the single-coat embodiment, the porosity-inducing agent is a fugitive agent which induces porosity in the coating by evaporating during the curing cycle. Most preferably, the porosity inducing agent is glycerine, although nitro-cellulose, polyester, etc., may be used singly or in combination.

The thickness of the base coat layer is typically about 1.3 $\mu$m (0.05 mils) to about 76 $\mu$m (3 mils) but preferably about 7.6 $\mu$m (0.3 mils) to about 38 $\mu$m (1.5 mils). The thickness of the topcoat layer is about 2.5 $\mu$m (0.1 mils) to about 76

μm (3 mils) but is preferably about 7.6 μm (0.3 mils) to about 38 μm (1.5 mils).

The present invention also provides a dry film lubricant coated product that includes a substrate, preferably a metal (e.g., steel, nickel-base, titanium-base, aluminum-base, etc.) substrate, coated with the dry film lubricant coating of the present invention. Any metal substrate known in the art may be coated, particularly load bearing surfaces or surfaces where adhesive or fretting wear occurs due to sliding, rotation, or vibration motion of mating parts. The invention finds particular application in gas turbine engine components such as compressor and turbine blade roots, and mating surfaces such as cases and flanges, shafts and sleeves, and threaded bolts and nuts. The inventive dry film lubricants can also be applied to non-metallic substrates such as plastics, organic matrix composites, ceramics, and ceramic matrix composites.

Reference will now be made to specific examples using the processes described above. It is to be understood that the examples are provided to more completely describe preferred embodiments, and that no limitation to the scope of the invention is intended thereby. The examples indicate preferred aqueous and solvent-based compositions for providing a dry film lubricant coating that are obtained by combining and mixing the indicated components together.

EXAMPLE 1

An aqueous composition was made by combining the following components with mixing: 18% barium fluoride, 10% calcium fluoride, 24% silicone resin emulsion (Silres M50E), and 48% water, all on a weight percent basis. The coating was applied by spray-gun application, and was dried and cured to provide a coating with superior lubricating properties even after exposure to temperatures in excess of 300° C.

EXAMPLE 2

An aqueous composition was made by combining the following components with mixing: 18% barium fluoride, 10% calcium fluoride, 24% silicone resin emulsion (Silres M50E), 1% xylene, 1% ammonium benzoate (10% solution), 0.001% polyether-modified dimethylpolysiloxane wetting agent, and 46% water, all on a weight percent basis. The coating was applied by spray-gun application, and was dried and cured to provide a coating with superior lubricating properties even after exposure to temperatures in excess of 300° C.

EXAMPLE 3

An aqueous composition was made by combining the following components with mixing: 40% barium fluoride, 30% calcium fluoride, 20% silicone resin emulsion (Silres M50E), and 10% water, all on a weight percent basis. The coating was applied by spray-gun application, and was dried and cured to provide a coating with superior lubricating properties even after exposure to temperatures in excess of 300° C.

EXAMPLE 4

An aqueous composition was made by combining the following components with mixing: 27% barium fluoride, 18% calcium fluoride, 40% silicone resin emulsion (Silres M50E), 5% xylene, 3% ammonium benzoate (10% solution), 0.001% polyether-modified dimethylpolysiloxane wetting agent, and 7% water, all on a weight percent basis. The coating was applied by spray-gun application, and was dried and cured to provide a coating with superior lubricating properties even after exposure to temperatures in excess of 300° C.

EXAMPLE 5

An aqueous composition was made by combining the following components with mixing: 18% barium fluoride, 10% calcium fluoride, 24% silicone resin emulsion (Silres M50E), 2% glycerine, and 46% water, all on a weight percent basis. The coating was applied by spray-gun application, and was dried and cured to provide a coating with superior lubricating properties even after exposure to temperatures in excess of 300° C.

EXAMPLE 6

An aqueous composition was made by combining the following components with mixing: 18% barium fluoride, 10% calcium fluoride, 24% silicone resin emulsion (Silres M50E), 1% xylene, 1% ammonium benzoate (10% solution), 0.001% polyether-modified dimethylpolysiloxane wetting agent, 2% glycerine, and 44% water, all on a weight percent basis. The coating was applied by spray-gun application, and was dried and cured to provide a coating with superior lubricating properties even after exposure to temperatures in excess of 300° C.

EXAMPLE 7

An aqueous composition was made by combining the following components with mixing: 27% barium fluoride, 18% calcium fluoride, 40% silicone resin emulsion (Silres M50E), 10% glycerine, and 5% water, all on a weight percent basis. The coating was applied by spray-gun application, and was dried and cured to provide a coating with superior lubricating properties even after exposure to temperatures in excess of 300° C.

EXAMPLE 8

An aqueous composition was made by combining the following components with mixing: 22% barium fluoride, 15% calcium fluoride, 40% silicone resin emulsion (Silres M50E), 5% xylene, 3% ammonium benzoate (10% solution), 0.001% polyether-modified dimethylpolysiloxane wetting agent, 10% glycerine, and 5% water, all on a weight percent basis. The coating was applied by spray-gun application, and was dried and cured to provide a coating with superior lubricating properties even after exposure to temperatures in excess of 300° C.

EXAMPLE 9

A solvent-based composition was made by combining the following components with mixing: 18% barium fluoride, 10% calcium fluoride, 12% silicone resin powder (Silres MK), and 60% xylene, all on a weight percent basis. The coating was applied by spray-gun application, and was dried and cured to provide a coating with superior lubricating properties even after exposure to temperatures in excess of 300° C.

EXAMPLE 10

A solvent-based composition was made by combining the following components with mixing: 18% barium fluoride, 10% calcium fluoride, 12% silicone resin powder (Silres MK), 0.001% polyether-modified dimethylpolysiloxane wetting agent, and 60% xylene, all on a weight percent basis. The coating was applied by spray-gun application, and was dried and cured to provide a coating with superior lubricating properties even after exposure to temperatures in excess of 300° C.

EXAMPLE 11

A solvent-based composition was made by combining the following components with mixing: 27% barium fluoride, 18% calcium fluoride, 20% silicone resin powder (Silres MK), and 35% xylene, all on a weight percent basis. The coating was applied by spray-gun application, and was dried and cured to provide a coating with superior lubricating properties even after exposure to temperatures in excess of 300° C.

EXAMPLE 12

A solvent-based composition was made by combining the following components with mixing: 27% barium fluoride, 18% calcium fluoride, 20% silicone resin powder (Silres MK), 0.001% polyether-modified dimethylpolysiloxane wetting agent, and 35% xylene, all on a weight percent basis. The coating was applied by spray-gun application, and was dried and cured to provide a coating with superior lubricating properties even after exposure to temperatures in excess of 300° C.

EXAMPLE 13

A solvent-based composition was made by combining the following components with mixing: 18% barium fluoride, 10% calcium fluoride, 12% silicone resin powder (Silres MK), 2% glycerine, and 58% xylene, all on a weight percent basis. The coating was applied by spray-gun application, and was dried and cured to provide a coating with superior lubricating properties even after exposure to temperatures in excess of 300° C.

EXAMPLE 14

A solvent-based composition was made by combining the following components with mixing: 18% barium fluoride, 10% calcium fluoride, 12% silicone resin powder (Silres MK), 0.001% polyether-modified dimethylpolysiloxane wetting agent, 2% glycerine, and 58% xylene, all on a weight percent basis. The coating was applied by spray-gun application, and was dried and cured to provide a coating with superior lubricating properties even after exposure to temperatures in excess of 300° C.

EXAMPLE 15

A solvent-based composition was made by combining the following components with mixing: 27% barium fluoride, 18% calcium fluoride, 20% silicone resin powder (Silres MK), 10% glycerine, and xylene, all on a weight percent basis. The coating was applied by spray-gun application, and was dried and cured to provide a coating with superior lubricating properties even after exposure to temperatures in excess of 300° C.

EXAMPLE 16

A solvent-based composition was made by combining the following components with mixing: 22% barium fluoride, 15% calcium fluoride, 20% silicone resin powder (Silres MK), 0.001% polyether-modified dimethylpolysiloxane wetting agent, 10% glycerine, and 33% xylene, all on a weight percent basis. The coating was applied by spray-gun application, and was dried and cured to provide a coating with superior lubricating properties even after exposure to temperatures in excess of 300° C.

EXAMPLE 17

An aqueous composition was made by combining the following components with mixing: 25% barium fluoride, 15% calcium fluoride, 30% silicone resin emulsion (Silres M50E), 3% xylene, 2% ammonium benzoate (10-12% solution), 0.003% polyether-modified dimethylpolysiloxane wetting agent, and 25% water, all on a weight percent basis. The coating was applied by spray-gun application, and was dried and cured to provide a coating with superior lubricating properties even after exposure to temperatures in excess of 300° C.

EXAMPLE 18

An aqueous composition was made by combining the following components with mixing: 25% barium fluoride, 15% calcium fluoride, 30% silicone resin emulsion (Silres M50E), 3% xylene, 2% ammonium benzoate, 0.003% polyether-modified dimethylpolysiloxane wetting agent, 5% glycerine, and 20% water, all on a weight percent basis. The coating was applied by spray-gun application, and was dried and cured to provide a coating with superior lubricating properties even after exposure to temperatures in excess of 300° C.

EXAMPLE 19

An aqueous-composition was made by combining the following components by mixing: 24% barium fluoride, 3% $CaF_2$, 3% $MgF_2$ and/or $CeF_2$, 24% silicone resin emulsion, 1% xylene, 0.01% wetting agent, 1% ammonium benzoate (10% solution), and 44% water.

EXAMPLE 20

An aqueous composition was made by combining the following components by mixing: 32% $BaF_2$, 8% $CaF_2$, 8% $MgF_2$ and/or $CeF_2$, 40% silicone resin emulsion, 5% xylene, 0.2% wetting agent, 3% ammonium benzoate (10% solution) and the balance water.

EXAMPLE 21

An aqueous composition was made by combining the following components by mixing 28% $BaF_2$, 7% $CaF_2$, 5% $MgF_2$ and/or $CeF_2$, 32% silicone resin emulsion, 3% xylene, 0.03% wetting agent, 2% ammonium benzoate (10% solution) and the balance water.

EXAMPLE 22

An aqueous composition was made by combining the following components by mixing: 24% barium fluoride, 3% $CaF_2$, 3% $MgF_2$, 24% silicone resin emulsion, 1% xylene, 0.01% wetting agent, 1% ammonium benzoate (10% solution), 1% glycerine, and the balance water.

EXAMPLE 23

An aqueous composition was made by combining the following components by mixing: 32% $BaF_2$, 8% $CaF_2$, 8% $MgF_2$ and/or $CeF_2$, 40% silicone resin emulsion, 5% xylene, 0.2% wetting agent, 3% ammonium benzoate (10% solution), 5% glycerine, and the balance water.

EXAMPLE 24

An aqueous composition was made by combining the following components by mixing 28% $BaF_2$, 7% $CaF_2$, 5%

MgF$_2$ and/or CeF$_2$, 32% silicone resin emulsion, 3% xylene, 0.03% wetting agent, 2% ammonium benzoate (10% solution), 2% glycerine, and the balance water.

EXAMPLE 25

A solvent-based composition was made by combining the following components by mixing: 24% barium fluoride, 3% CaF$_2$, 3% MgF$_2$ and/or CeF$_2$, 12% silicone resin solids, 1% xylene, 0.01% wetting agent, and the balance xylene.

EXAMPLE 26

A solvent-based composition was made by combining the following components by mixing: 32% BaF$_2$, 8% CaF$_2$, 8% MgF$_2$ and/or CdF$_2$, 20% silicone resin solids, 5% xylene, 0.2% wetting agent, and the balance xylene.

EXAMPLE 27

A solvent-based composition was made by combining the following components by mixing 28% BaF$_2$, 7% CaF$_2$, 5% MgF$_2$ and/or CeF$_2$, 16% silicone resin solids, 3% xylene, 0.03% wetting agent, and the balance toluene.

EXAMPLE 28

A solvent-based composition was made by combining the following components by mixing: 24% barium fluoride, 3% CaF$_2$, 3% MgF$_2$ and/or CeF$_2$, 12% silicone resin solids, 1% xylene, 0.01% wetting agent, 1% glycerine, and the balance MEK.

EXAMPLE 29

A solvent-based composition was made by combining the following components by mixing: 32% BaF$_2$, 8% CaF$_2$, 8% MgF$_2$ and/or CeF$_2$, 20% silicone resin solids, 5% xylene, 0.2% wetting agent, 5% glycerine and the balance toluene.

EXAMPLE 30

A solvent-based composition was made by combining the following components by mixing 28% BaF$_2$, 7% CaF$_2$, 5% MgF$_2$ and/or CeF$_2$, 16% silicone resin solids, 3% xylene, 0.03% wetting agent, 2% glycerine and the balance MEK.

EXAMPLE 31

A multi-layer coating is provided as follows. First, an aqueous or solvent-based composition is made according to any of examples 1-30. That layer is then dried and cured as described above. Then, a topcoat composition is made by combining the following components with mixing: 25% graphite, 30% silicone resin emulsion (Silres M50E), 3% xylene, 2% ammonium benzoate, 0.003% polyether-modified dimethylpolysiloxane wetting agent, 5% glycerine, and 35% water. The topcoat is applied by spray-gun application, and is dried and cured to provide a multi-layer coating with superior lubricating properties even after exposure to temperatures in excess of 300° C.

EXAMPLE 32

A multi-layer coating is provided as follows. First, an aqueous or solvent-based composition is made according to any of examples 1-30. That layer is then dried and cured as described above. Then, a topcoat composition is made by combining the following components with mixing: 25% graphite, 15% silicone resin powder dissolved in solvent (Silres MK in xylene, toluene or MEK), 0.003% polyether-modified dimethylpolysiloxane wetting agent, 5% glycerine, and 50% xylene. The topcoat is applied by spray-gun application, and is dried and cured to provide a multi-layer coating with superior lubricating properties even after exposure to temperatures in excess of 300° C.

EXAMPLE 33

A multi-layer coating is provided as follows. First, an aqueous or solvent-based composition is made according to any of examples 1-30. That layer is then dried and cured as described above. Then, a topcoat composition is made by combining the following components with mixing: 5% molybdenum or tungsten disulfide, 30% silicone resin emulsion (Silres M50E), 3% xylene, 2% ammonium benzoate, 0.003% polyether-modified dimethylpolysiloxane wetting agent, 5% glycerine, and 55% water. The topcoat is applied by spray-gun application, and is dried and cured to provide a multi-layer coating with superior lubricating properties even after exposure to temperatures in excess of 300° C.

EXAMPLE 34

A multi-layer coating is provided as follows. First, an aqueous or solvent-based composition is made according to any of examples 1-30. That layer is then dried and cured as described above. Then, a topcoat composition is made by combining the following components with mixing: 30% molybdenum or tungsten disulfide, 15% silicone resin powder (e.g., Silres MK), 003% polyether-modified dimethylpolysiloxane wetting agent, 5% glycerine, and 50% xylene. The topcoat is applied by spray-gun application, and is dried and cured to provide a multi-layer coating with superior lubricating properties even after exposure to temperatures in excess of 300° C.

EXAMPLE 35

An aqueous composition was made by combining the following components with mixing: 45% barium fluoride, 40% silicone resin emulsion (Silres M50E), 1% xylene, 1% of a 10% solution of ammonium benzoate, 0.003% polyether-modified dimethylpolysiloxane wetting agent, 2% glycerine, and balance water, all on a weight percent basis. The coating was applied by spray-gun application, and was dried and cured to provide a coating with superior lubricating properties even after exposure to temperatures in excess of 300° C.

EXAMPLE 36

An aqueous composition was made by combining the following components by mixing 28% BaF$_2$, 32% silicone resin emulsion, 3% xylene, 0.03% wetting agent, 2% ammonium benzoate (10% solution), 2% glycerine, and the balance water.

EXAMPLE 37

An aqueous composition was made by combining the following components by mixing 50% BaF$_2$, 32% silicone resin emulsion, 3% xylene, 0.03% wetting agent, 2% ammonium benzoate (10% solution), 2% glycerine, and the balance water.

EXAMPLE 38

An aqueous composition was made by combining the following components by mixing 28% CaF$_2$, 32% silicone resin emulsion, 3% xylene, 0.03% wetting agent, 2% ammonium benzoate (10% solution), 2% glycerine, and the balance water.

EXAMPLE 39

An aqueous composition was made by combining the following components by mixing 50% $CaF_2$, 32% silicone resin emulsion, 3% xylene, 0.03% wetting agent, 2% ammonium benzoate (10% solution), 2% glycerine, and the balance water.

EXAMPLE 40

An aqueous composition was made by combining the following components by mixing 12% $BaF_2$, 3% $CaF_2$, 5% silicone resin binder, 3% xylene, 0.03% wetting agent, 2% ammonium benzoate (10% solution), 2% glycerine, and the balance water.

EXAMPLE 41

An aqueous composition was made by combining the following components by mixing 12% $BaF_2$, 3% $CaF_2$, 65% silicone resin binder, 3% xylene, 0.03% wetting agent, 2% anti-rust agent, 2% glycerine, and the balance water.

While the invention has been illustrated and described in detail in the forgoing description, the same is to be considered as illusive and not restrictive in character, it being understood that only the preferred embodiments have been shown and described, and that all changes and modifications that come within the spirit of the invention are desired to be protected.

What is claimed is:

1. An aqueous coating composition for providing a dry film lubricant coating to a substrate, said composition comprising:
   (a) 10-70% by weight alkaline earth metal fluoride;
   (b) 2-65% by weight of an alkyl silicone resin emulsion in water; and
   (c) water.
2. A coating composition according to claim 1 wherein said composition includes about 20-50% alkaline earth metal fluoride.
3. A coating composition according to claim 1 wherein said alkaline earth metal fluoride comprises a member selected from the group consisting of $BaF_2$, $CaF_2$, $CeF_2$, and $MgF_2$.
4. A coating composition according to claim 1 wherein said alkaline earth metal fluoride comprises $BaF_2$.
5. A coating composition according to claim 1 wherein said alkaline earth metal fluoride comprises 5-50% $BaF_2$.
6. A coating composition according to claim 1 wherein said alkaline earth metal fluoride comprises 15-40% $BaF_2$.
7. A coating composition according to claim 1 wherein said alkaline earth metal fluoride comprises 28-50% $BaF_2$.
8. A coating composition according to claim 1 wherein said alkaline earth metal fluoride comprises 18-27% $BaF_2$.
9. A coating composition according to claim 1 wherein said alkaline earth metal fluoride comprises $CaF_2$.
10. A coating composition according to claim 1 wherein said alkaline earth metal fluoride comprises 3-50% $CaF_2$.
11. A coating composition according to claim 1 wherein said alkaline earth metal fluoride comprises 5-30% $CaF_2$.
12. A coating composition according to claim 1 wherein said alkaline earth metal fluoride comprises 28-50% $CaF_2$.
13. A coating composition according to claim 1 wherein said alkaline earth metal fluoride comprises 10-18% $CaF_2$.
14. A coating composition according to claim 1 wherein said alkaline earth metal fluoride comprises 1-20% $MgF_2$.
15. A coating composition according to claim 1 wherein said alkaline earth metal fluoride comprises 3-10% $MgF_2$.
16. A coating composition according to claim 1 wherein said alkaline earth metal fluoride comprises 4-6% $MgF_2$.
17. A coating composition according to claim 1 wherein said alkaline earth metal fluoride comprises 1-20% $CeF_2$.
18. A coating composition according to claim 1 wherein said alkaline earth metal fluoride comprises 3-10% $CeF_2$.
19. A coating composition according to claim 1 wherein said alkaline earth metal fluoride comprises 4-6% $CeF_2$.
20. A coating composition according to claim 1 wherein said alkaline earth metal fluoride comprises 5-35 weight % $BaF_2$ and 5-35 weight % $CaF_2$.
21. A coating composition according to claim 1 wherein said alkaline earth metal fluoride comprises 18-27% $BaF_2$, and 10-18% $CaF_2$.
22. A coating composition according to claim 1 wherein said alkaline earth metal fluoride comprises 3-35% $BaF_2$, 3-22% $CaF_2$, and 1-16% $MgF_2$.
23. A coating composition according to claim 1 wherein said alkaline earth metal fluoride comprises 24-32% $BaF_2$, 3-10% $CaF_2$, and 3-8% $CeF_2$.
24. A coating composition according to claim 1 wherein said alkaline earth metal fluoride comprises 3-35% $BaF_2$, 3-22% $CaF_2$, and 1-16% $MgF_2$.
25. A coating composition according to claim 1 wherein said alkaline earth metal fluoride comprises 24-32% $BaF_2$, 3-10% $CaF_2$, and 3-8% $CeF_2$.
26. A coating composition according to claim 1 wherein said coating composition comprises 5-30% silicone resin binder.
27. A coating composition according to claim 1 wherein said coating composition comprises 10-20% alkyl silicone resin emulsion in water.
28. A composition of matter comprising a dry film lubricant coating fixed to a substrate, wherein said dry film lubricant coating comprises an alkaline earth metal flouride and an alkyl silicone resin emulsion in water.
29. A coating composition according to claim 1 and further including up to 15 weight % of an organic solvent.
30. A coating composition according to claim 29 wherein said organic solvent is xylene.
31. A coating composition according to claim 1 wherein said coating composition further includes about 0.1% to about 10% of an anti-rust agent.
32. A coating composition according to claim 1 wherein said coating composition further includes about 0.01% to about 5% of a wetting agent.
33. A coating composition according to claim 1, and further comprising xylene, ammonium benzoate and wetting agent, wherein said coating composition consist essentially of:
   (a) 10-70% by weight of an alkaline earth metal flouride;
   (b) 5-65% by weight of an alkyl silicone resin emulsion in water;
   (c) 1% to 5% xylene;
   (d) 0.1% to about 0.5% ammonium benzoate;
   (e) 0.01% to about 0.05% of a wetting agent; and
   (f) water.
34. A coating composition according to claim 1 wherein said coating composition additionally comprises 1-45% by weight of a porosity-inducing agent.
35. A coating composition according to claim 34 wherein said coating composition comprises 2-10% of said porosity inducing agent.
36. A coating composition according to claim 35 wherein said porosity inducing agent is glycerine.
37. A coating composition according to claim 1, and further comprising xylene, ammonium benzoate, wetting agent and porosity inducing agent, wherein said coating composition consists essentially of:
  (a) 10-70% alkaline earth metal fluoride;
  (b) 5-65% alkyl silicone resin emulsion in water;
  (c) 1-5% xylene;
  (d) 0.1-0.5% ammonium benzoate;
  (e) 0.01-0.05% wetting agent;
  (f) 1-40% porosity inducing agent and
  (g) water.

38. A coating composition according to claim 1, and further comprising xylene, ammonium benzoate and wetting agent, wherein said coating composition comprises:
  (a) 18-27% $BaF_2$;
  (b) 10-18% $CaF_2$;
  (c) 24-40% alkyl silicone resin emulsion in water;
  (d) 1-5% xylene;
  (e) 0.1-0.3% ammonium benzoate;
  (f) 0.01-0.02% wetting agent; and
  (g) water.

39. A multi-layer, dry film lubricant coating, comprising:
  (a) a basecoat layer comprising an alkaline earth metal flouride and an alkyl silicone resin emulsion in water; and
  (b) a topcoat layer comprising a layer-lattice solid and an alkyl silicone resin emulsion in water.

40. A multi-layer dry film lubricant coating according to claim 39 wherein said layer-lattice solid is a member selected from the group consisting of graphite, molybdenum disulfide, and tungsten disulfide.

41. A composition of matter comprising a multi-layer, dry film lubricant coating fixed to a substrate, wherein said multi-layer, dry film lubricant coating comprises:
  (a) a basecoat layer comprising an alkaline earth metal fluoride and an alkyl silicone resin emulsion in water; and
  (b) a topcoat layer comprising a layer-lattice solid and an alkyl silicone resin emulsion in water.

42. A method of providing a multi-layer, dry film lubricant coating to a substrate, said method comprising:
  (a) applying a basecoat layer comprising 10-70% by upright an alkaline earth metal fluoride; 2-65% by upright of an alkyl silicone resin emulsion in water (c) water to a substrate; and drying and curing the said coating to fix the coating on the said substrate; and
  (b) subsequently applying a topcoat layer comprising a layer-lattice solid and an alkyl silicone resin emulsion in water to said substrate.

43. The method of claim 42 wherein said basecoat layer, further comprising xylene, ammonium benzoate and a wetting agent, is applied as an aqueous coating composition comprising:
  (a) 10-70% by weight alkaline earth metal fluoride;
  (b) 5-65% by weight of an alkyl silicone resin emulsion in water;
  (c) 1% to 5% xylene;
  (d) 0.1% to about 0.5% ammonium benzoate;
  (e) 0.01% to about 0.05% of a wetting agent; and
  (f) water.

44. The method of claim 42 wherein said topcoat layer is applied as a coating composition comprising:
  (a) 5-65% by weight of a layer lattice solid; and
  (b) 15-50% by weight of an alkyl silicone resin emulsion in water.

45. The method of claim 44 wherein said layer lattice solid is a member selected from the group consisting of graphite, molybdenum disulfide, and tungsten disulfide.

46. The method of claim 42 wherein said topcoat layer additionally comprises a wetting agent.

47. The method of claim 42 wherein said topcoat layer additionally comprises a porosity inducing agent.

* * * * *